(12) United States Patent
Yamasaki et al.

(10) Patent No.: US 6,252,833 B1
(45) Date of Patent: Jun. 26, 2001

(54) OPTICAL HEAD

(75) Inventors: Hiroyuki Yamasaki, Amagasaki; Tomoko Miyaura, Habikino, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/480,491

(22) Filed: Jan. 11, 2000

(30) Foreign Application Priority Data

Jan. 19, 1999 (JP) .................................................. 11-010238

(51) Int. Cl.$^7$ ....................................................... G11B 7/13
(52) U.S. Cl. ..................................... 369/44.14; 369/44.23; 369/44.41
(58) Field of Search ............................ 369/44.14, 44.15, 369/44.23, 44.28, 44.41, 112, 44.12

(56) References Cited

U.S. PATENT DOCUMENTS 5,828,644 * 10/1998 Gage et al. ................... 369/44.15 X
5,881,042 * 3/1999 Knight ........................... 369/44.14 X

FOREIGN PATENT DOCUMENTS 5-164968    6/1993  (JP) .

* cited by examiner

Primary Examiner—Muhammad Edun
(74) Attorney, Agent, or Firm—Morrison & Foerster LLP

(57) ABSTRACT

Near-field light is generated from a fine opening formed in a silicon substrate to thereby record information on a recording layer of a recording medium. When the information is read out, reflected light from the recording layer is detected by a photodiode. The photodiode is formed by providing a boron-implanted layer around the fine opening in the silicon substrate. The detection signal of the reflected light is derived from the electrode. By this photodiode, the reflected light for reading is efficiently detected.

6 Claims, 7 Drawing Sheets

OPTICAL HEAD

RELATED APPLICATIONS

The present application claims priority to Japanese Patent Application No. 11-10238 filed Jan. 19, 1999, the contents of which are hereby incorporated by reference.

BACKGROUND OF THE INVENTION

1. Field of the invention

The present invention relates to an optical head, and particularly, to an optical head used for high-density optical recording and reading onto and from optical recording media.

2. Description of the Related Art

In recent years, in the field of optical memories for optical recording and reading of information, an optical head being capable of recording a larger amount of information, that is, having a remarkably improved recording density has been required with increase in speed of computers and development of multimedia. As a technology to record and read information at high densities, a near-field light recording technology has been proposed. In conventional optical memories using laser beams, the upper limit of the recording density depends on the diffraction limit of light, so that only a mark of approximately the wavelength of light (approximately several hundred nanometers) can be recorded and read out.

In an optical memory using a near-field light phenomenon which has been proposed in recent years, a mark of several tens of nanometers smaller than the diffraction limit of light can be written as a signal and read out by applying light for recording and reading under a condition where a probe having a fine opening of not more than the wavelength of light or an optical head using a solid immersion lens has been brought near to the recording medium (optical disk) until it is only several tens of nanometers away therefrom.

In a case where information on a recording medium is read out by use of near-field light, reflected light converted into propagation light and reflected is detected. However, since the use efficiency of near-field light is, intrinsically, considerably low, it is necessary to efficiently detect the reflected light.

As a technology to detect the reflected light for reading, a near-field optical microscope in which a fine opening array and a photoelectric array are integrally formed is disclosed in Japanese Laid-open Patent Application No. 5-164968. Moreover, an integrated probe in which a photodetector is integrated is described on page 579 of Applied Physics Letter No. 68 (1996). However, it is the present state that desired detection efficiency cannot always be obtained even with these detection technologies.

SUMMARY OF THE INVENTION

An object of the present invention is to solve the above-mentioned problem.

Another object of the present invention is to provide an optical head using the near-field light phenomenon, said optical head being capable of efficiently detecting the reflected light for reading.

These and other objects are achieved by an optical head comprising near-field light generating device for generating near-field light; a semiconductor substrate situated in a near-field area or in a vicinity thereof; a photodetector for detecting reflected light, from a recording layer, of the near-field light generated by the near-field light generating device, said photodetector being formed on the semiconductor substrate.

In the present invention, to read information on the recording layer, reflected light being converted into propagation light at the recording layer and reflected is read by the photodetector. The photodetector being formed in the near-field area or in the vicinity thereof is situated extremely close to the recording layer, so that the reflected light is more efficiently detected than ever. In addition, since the photodetector is integrally formed on the substrate made of a semiconductor material, the space can efficiently be used, which greatly contributes to weight reduction of the optical head.

Further, the photodetector can be manufactured by an ordinary semiconductor process and is excellent in mass productivity. In this respect, it is preferable that a photodiode be formed on the semiconductor substrate as the photodetector.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Hereinafter, embodiments of an optical head according to the present invention will be described with reference to the accompanying drawings.

First Embodiment, see FIGS. 1 to 4

Figure 1:
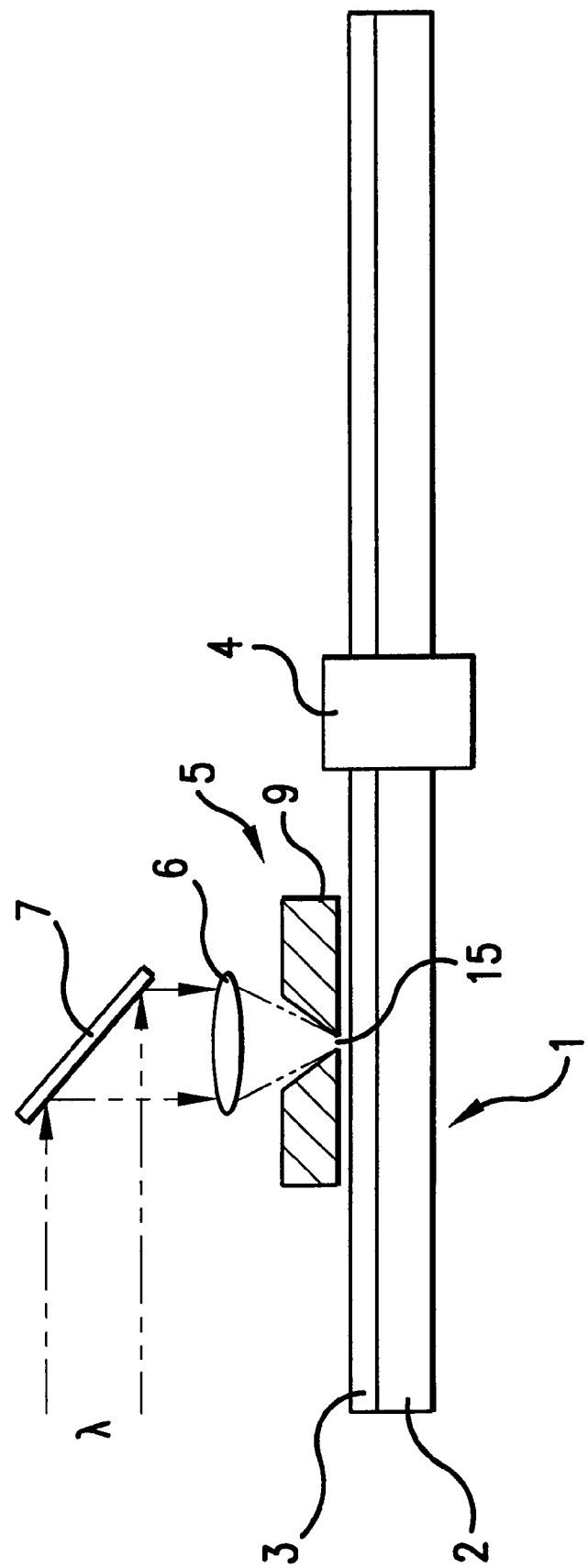
FIG. 1 briefly shows the structure of an optical head according to a first embodiment of the present invention.

In FIG. 1, reference number 1 represents a recording medium, and reference number 5 represents an optical head. The recording medium 1 comprises a substrate 2 and a recording layer 3 formed on the substrate 2, and is rotatable about a rotation driver shaft 4. The recording medium 1 may be any given structure.

In the optical head 5, a fine opening 15 is formed in a silicon substrate 9 as the near-field light generating device.

Figure 2:
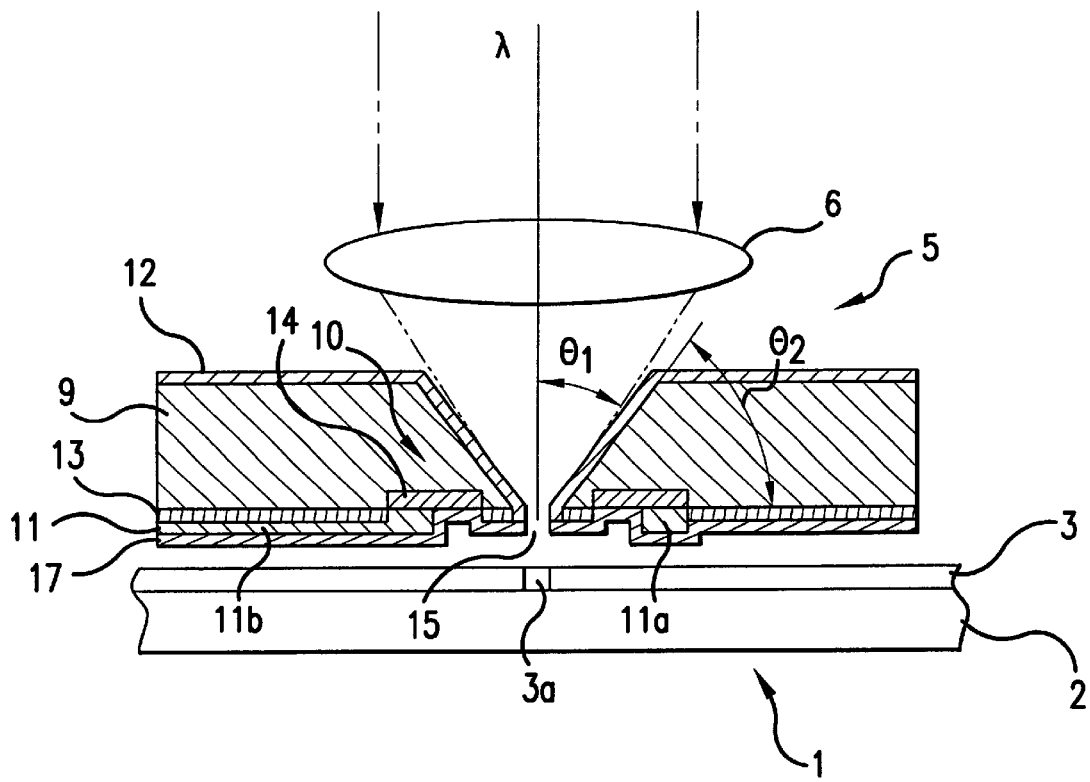
FIG. 2 is a cross-sectional view showing details of the optical head according to the first embodiment.

Light of a wavelength λ emitted from a non-illustrated light source (a laser diode, a light emitting diode or the like is used) and collimated into parallel light is incident on an imaging lens 6 through a mirror 7. The incident light is condensed to the fine opening 15 at an angle θ1 as shown in FIG. 2.

Since the diameter of the fine opening 15 is not more than the wavelength λ, near-field light leaks to the side of the recording medium 1. The distance between the recording medium 1 and the fine opening 15 is not more than the wavelength λ (approximately 0.05 to 0.1 μm) so that the recording medium 1 and the fine opening 15 are close to each other in the area where the near-field light leaks. Therefore, the near-field light is applied to the recording layer 3 in a spot of a diameter substantially the same as that of the fine opening 15 to form a recording pit 3a. When the diameter of the fine opening 15 is 0.1 μm, the diameter of the near-field light (the diameter of the recording pit 3a) is approximately 0.1 μm, and the recording density at this time is approximately 50 Gbit/inch$^2$. Thus, recording at an extremely high density is achieved.

At the time of reading, like at the time of recording, near-field light is applied to the recording layer 3 through the fine opening 15, and converted into propagation light at the recording layer 3 to be reflected. The reflected light is detected by a subsequently detailed photodiode 10 to obtain a reproduction signal corresponding to the recording pit 3a. At the time of recording, since the photodiode 10 is situated extremely close to the reflecting surface, that is, the recording layer 3, the light quantity loss is small, so that an excellent reproduction signal with a high S/N ratio is obtained.

The structure and manufacturing process of the photodiode 10 will hereinafter be described.

The photodiode 10 is of a p-n junction type comprising the silicon substrate 9 and a boron-implanted layer 14 as shown in FIG. 2. On the silicon substrate 9, electrodes 11 and 12 are formed.

Figure 4:
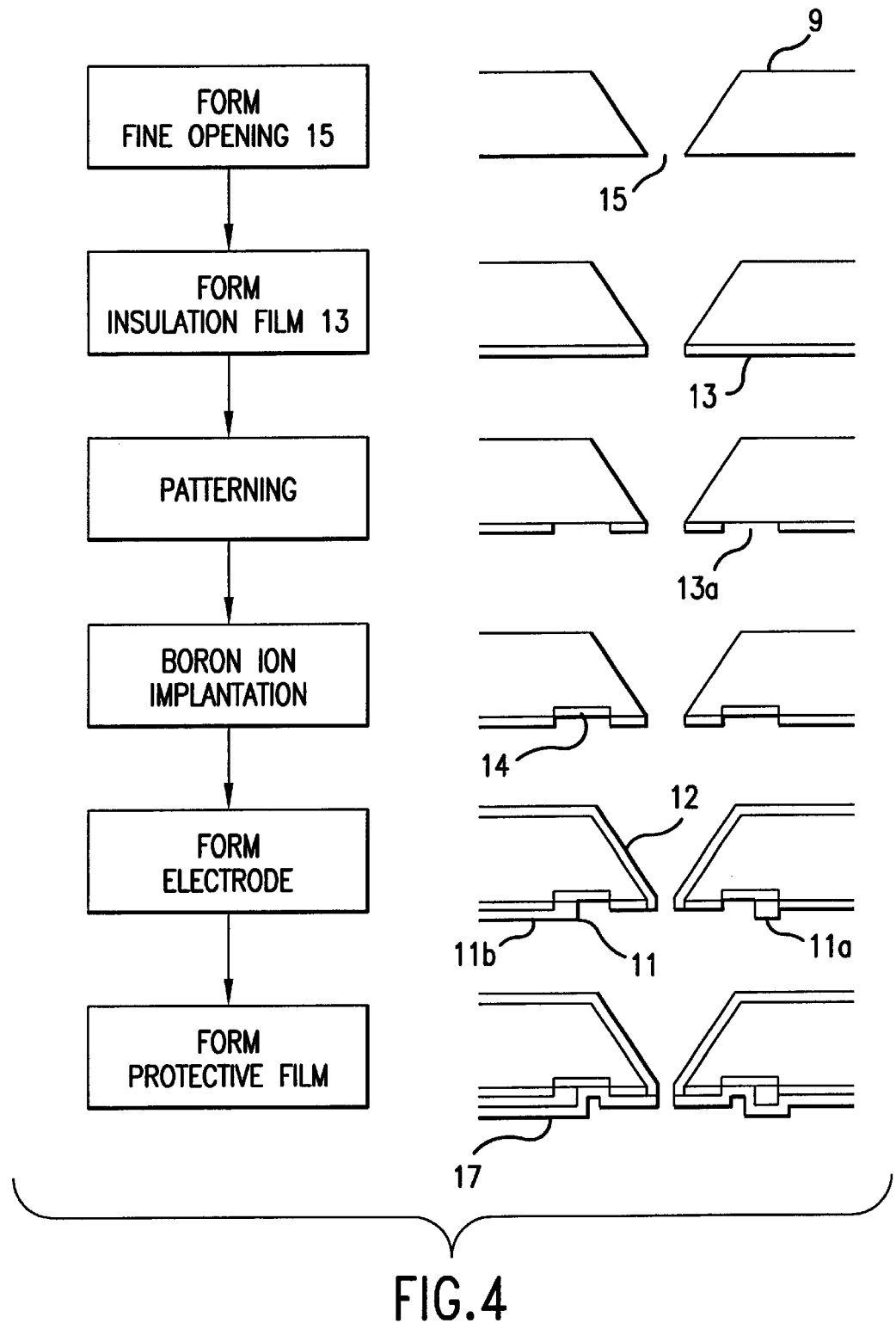
FIG. 4 is a view of assistance in explaining a manufacturing process of a photodiode in the first embodiment.

The manufacturing process is as shown in FIG. 4. First, the fine opening 15 with an angle θ2 (see FIG. 2) of approximately 60° and a diameter of 0.1 μm is formed by anisotropic etching in the n-type silicon substrate 9 with a thickness of 200 μm.

Then, an insulation film 13 of SiO$_2$ with a thickness of 0.02 μm is formed on the rear surface of the substrate 9 by thermal oxidation, and an annular concave portion 13a with the fine opening 15 as the center is formed in the insulation film 13 by patterning. The inner diameter of the concave portion 13a is 2 μm, and the outer diameter thereof is 10 pm. Then, boron is implanted into the concave portion 13a to the depth of 0.2 μm by ion implantation to form the boron-implanted layer 14. With this, the photodiode 10 of p-n junction type is formed.

Figure 3:
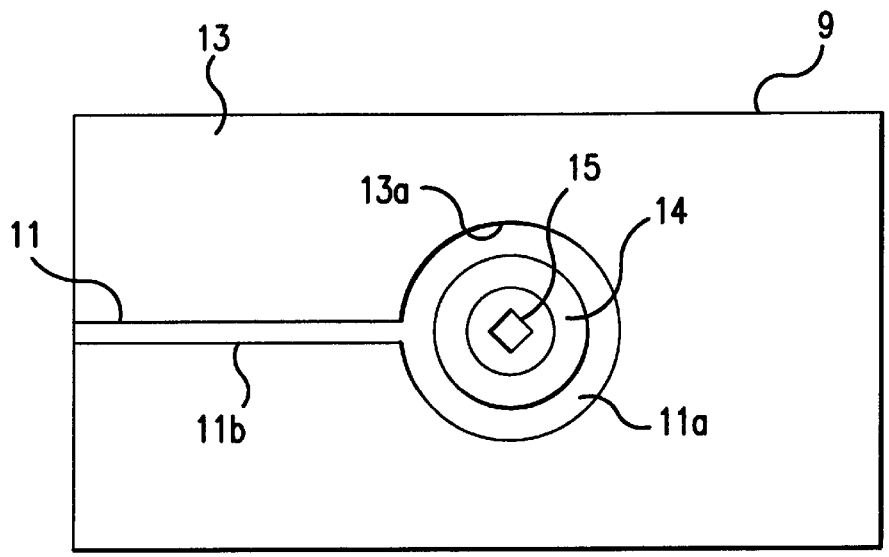
FIG. 3 is a bottom view of the optical head according to the first embodiment where a protective film is omitted.

The electrode 11 formed by patterning aluminum in a thickness of 0.03 μm comprises an annular portion 11a formed on the boron-implanted layer 14, and an extending portion 11b formed on the insulation film 13 (see FIG. 3). The other electrode 12 is formed of aluminum in a thickness of 0.03 μm on the substrate 9 by sputtering. The electrode 12 extends from the upper surface of the substrate 9 to the tip of the fine opening 15.

Lastly, an SiO$_2$ film with a thickness of 0.01 μm is formed on the rear surface of the substrate 9 by chemical vapor deposition to form a protective film 17.

Figure 5:
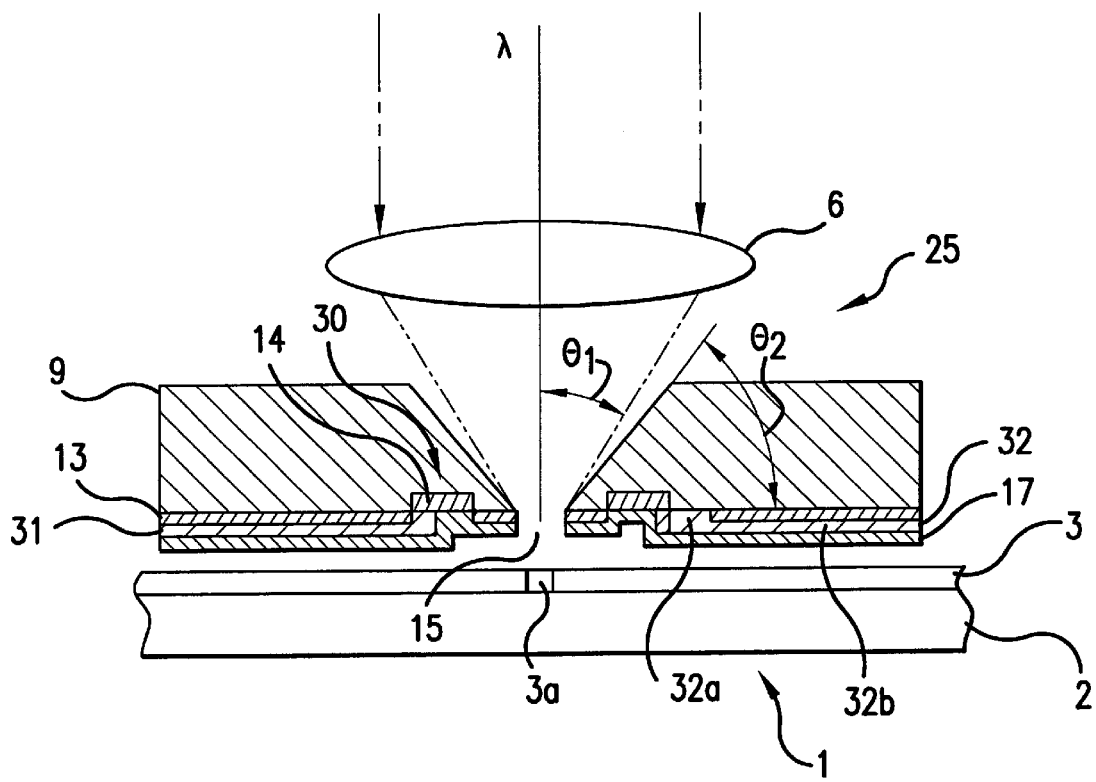
FIG. 5 is a cross-sectional view showing details of an optical head according to a second embodiment of the present invention.
Figure 6:
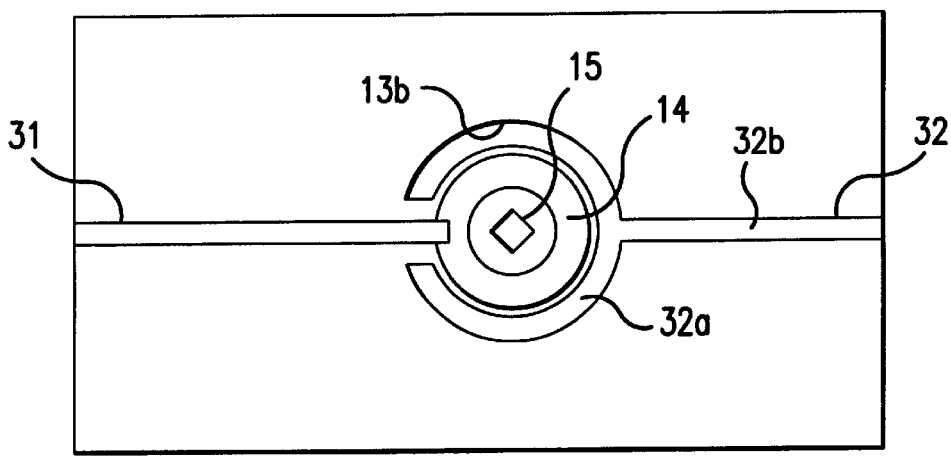
FIG. 6 is a bottom view of the optical head according to the second embodiment where a protective film is omitted.
Figure 7:
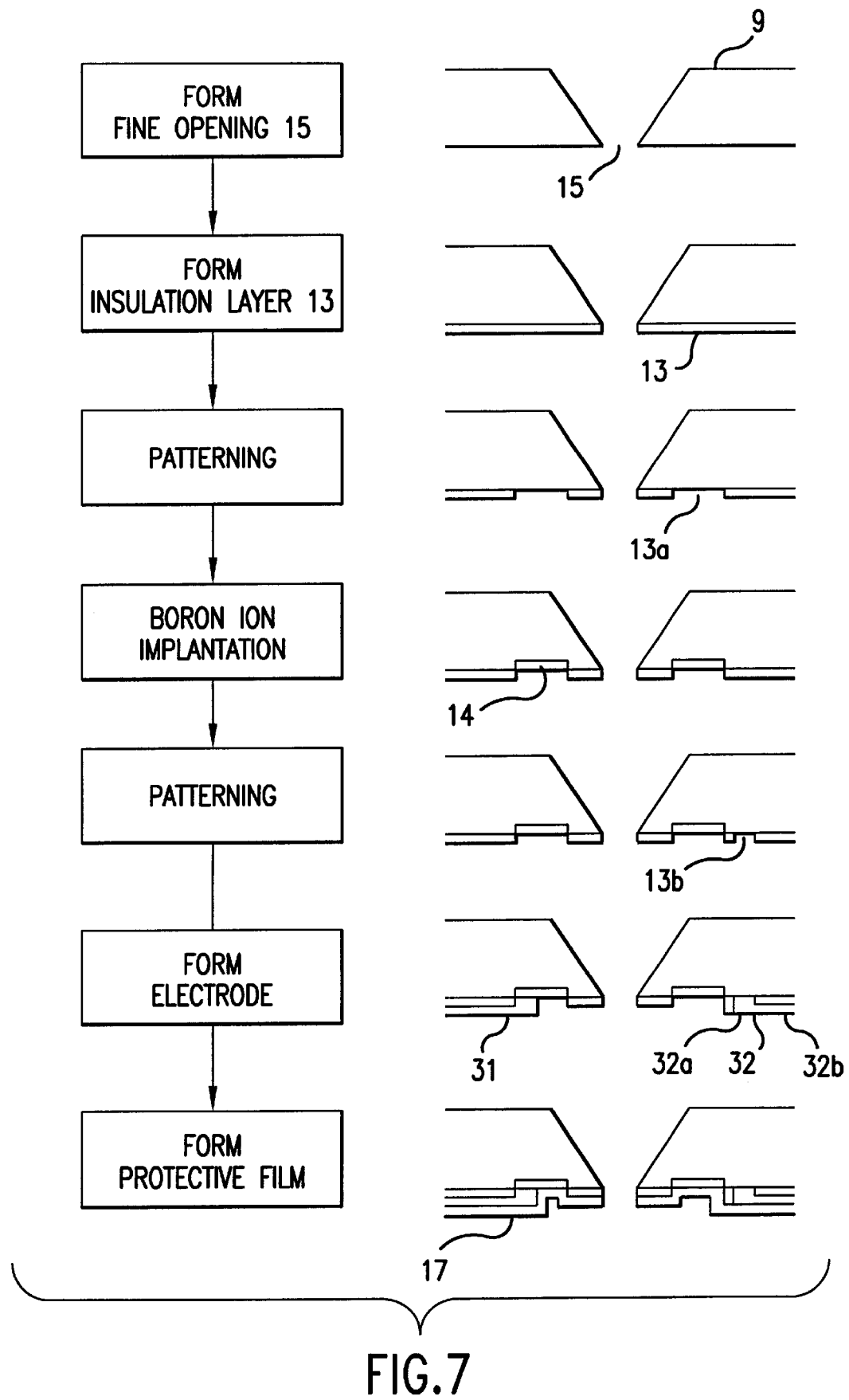
FIG. 7 is a view of assistance in explaining a manufacturing process of a photodiode in the second embodiment.

Second Embodiment, see FIGS. 5 to 7

An optical head 25 according to the second embodiment basically has a structure similar to the optical head according to the first embodiment shown in FIG. 1, but is different therefrom in that the configurations of electrodes 31 and 32 of a photodiode 30 are different from those of the electrodes 11 and 12. Therefore, in FIGS. 5 to 7, the elements the same as those of the first embodiment are designated by the same reference numbers and the descriptions thereof will be omitted.

As shown in FIGS. 5 and 6, the electrode 31 extends in a straight line from the boron-implanted layer 14 on the insulation film 13. The electrode 32 comprises a substantially annular portion 32a formed so as to be in contact with the silicon substrate 9 outside the boron-implanted layer 14, and an extending portion 32b formed on the insulation film 13.

A manufacturing process thereof is as shown in FIG. 7. The following manufacturing steps including the numerical values are the same as those of the first embodiment: the step of forming the fine opening 15 in the n-type silicon substrate 9; the step of forming the insulation layer 13 on the rear surface of the substrate 9 and forming the concave portion 13a by patterning; and the step of forming the boron-implanted layer 14 on the concave portion 13a to form the photodiode 30 of p-n junction type. In the second embodiment, however, the outer diameter of the concave portion 13a is 5 μm. The inner diameter thereof is 2 μm like in the first embodiment.

Then, the insulation film 13 is patterned to form a concave portion 13b with an inner diameter of 6 μm and an outer diameter of 10 μm. The concave portion 13b has a substantially annular shape in which a part near the electrode 31 is missing as shown in FIG. 6.

The electrode 31 is formed by patterning aluminum in a straight line from the boron-implanted layer 14 on the insulation film 13. The electrode 32 is formed by patterning aluminum from the concave portion 13b on the insulation film 13 to form the substantially annular portion 32a and the extending portion 32b. Lastly, the protective film 17 is formed on the rear surface of the substrate 9.

The recording and reading by use of near-field light in the second embodiment are similar to those of the first embodiment, and the effect that the reflected light at the time of reading is efficiently detected by the photodiode 30 is also similar to that of the first embodiment. Particularly, the second embodiment produces an advantage that the electrodes 31 and 32 can be formed at the same manufacturing step.

Figure 8:
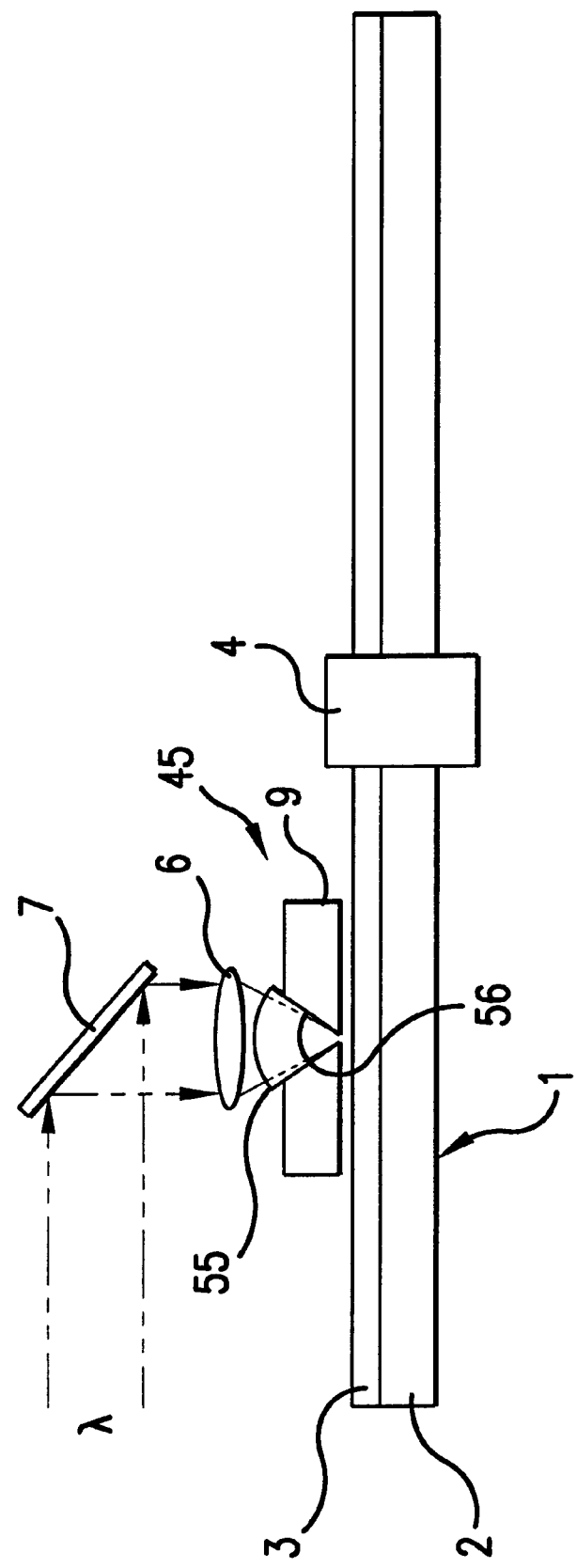
FIG. 8 briefly shows the structure of an optical head according to a third embodiment of the present invention.
Figure 9:
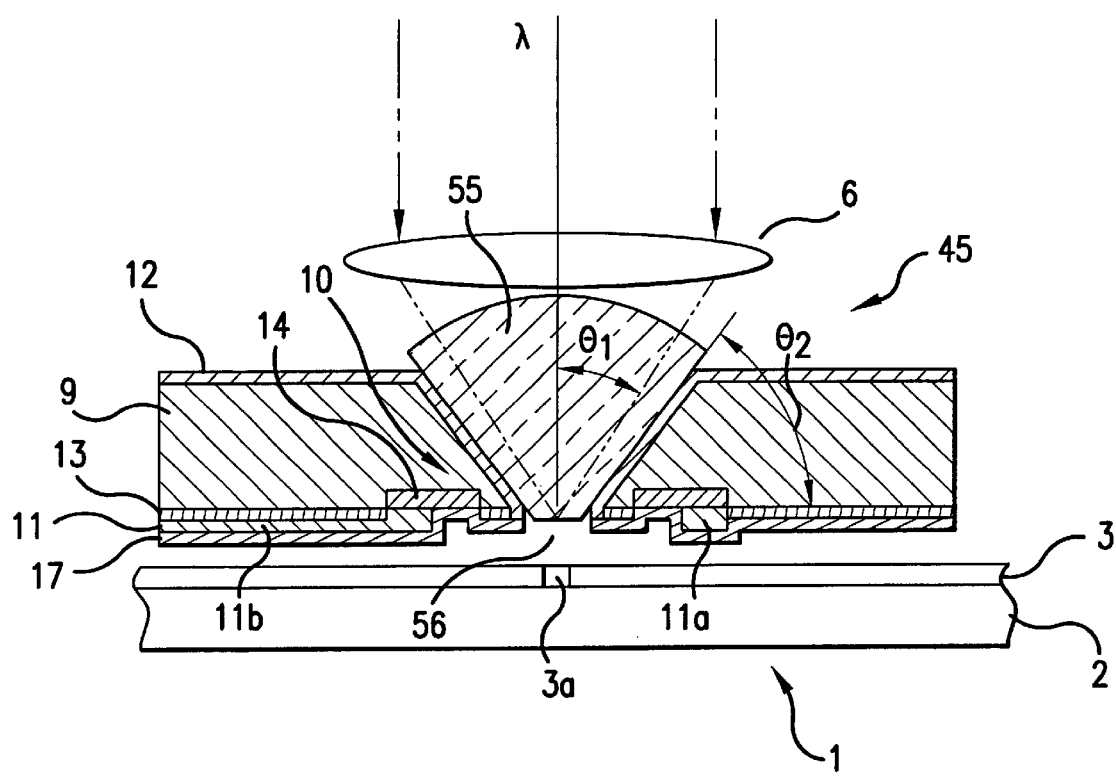
FIG. 9 is a cross-sectional view showing details of the optical head according to the third embodiment.
Figure 10:
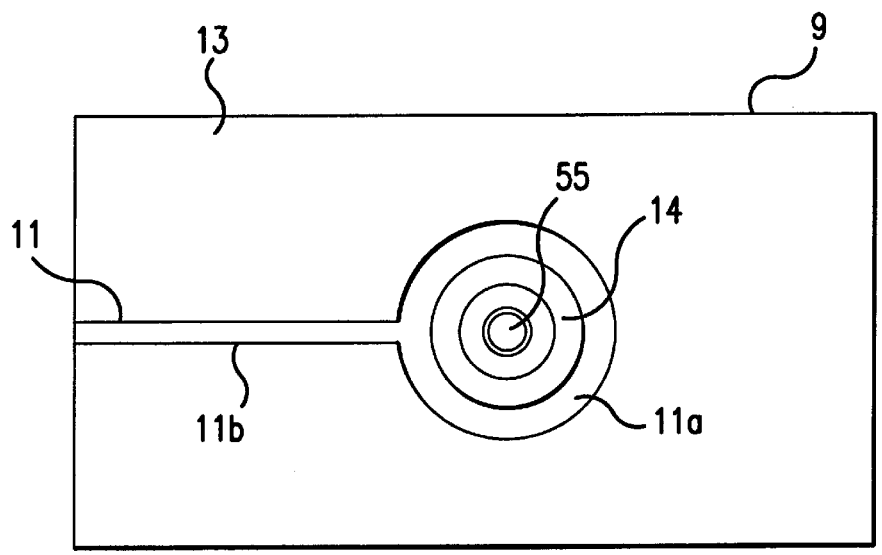
FIG. 10 is a bottom view of the optical head according to the third embodiment where a protective film is omitted.

Third Embodiment, see FIGS. 8 to 10

An optical head 45 according to a third embodiment uses a solid immersion lens 55 as the near-field light generating device. The solid immersion lens 55 is fitted in an opening 56 in the silicon substrate 9.

The solid immersion lens 55 is a known lens made of a high-refractive-index material. Light incident on the substantially hemispherical surface is condensed to the plane surface at the bottom and leaks as near-field light. The area where the near-field light leaks is not more than a quarter of the wavelength λ of the incident light, and the recording medium 1 and the solid immersion lens 55 are situated close to each other in the near-field area.

When the refractive index of the solid immersion lens 55 is n, the wavelength of the incident light becomes 1/n in the lens 55, which is equivalent to the numerical aperture NA of the imaging lens 6being multiplied byn. That is, when the wavelength λ of the incident light is 0.63 μm and the refractive index n of the solid immersion lens 55 is 1.8 and the angle of incidence θ1 is 37°, the spot diameter of the near-field light (the diameter of the recording pit 3a) is approximately 0.29 μm. The recording density at this time is as high as approximately 6 Gbit/inch$^2$.

In the third embodiment, the silicon substrate 9 functions as the holder for the solid immersion lens 55, and the structure thereof is the same as that of the substrate 9 of the first embodiment shown in FIGS. 2 and 3 and the manufacturing process is as shown in FIG. 4. Therefore, the effect of the photodiode 10 is the same as that of the first embodiment.

Other Embodiments

The optical head according to the present invention is not limited to the above-described embodiment but various changes and modifications are possible within the gist of the invention.

Particularly, the photodiodes of p-n junction type shown in the embodiments are not limited to circular ones but may have various shapes such as a square shape. Likewise, the fine opening is not necessarily square but may be circular.

As the manufacturing process, the opening may be formed by use of electron beams or laser beams after the photodiode is formed on the substrate. In this case, it is necessary to give consideration so that the photodiode is not short-circuited when the opening is formed.

The photodetector is not necessarily a photodiode, but may be a photoelectric conversion element formed by providing an element material in the vicinity of the opening.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An optical head, comprising:

near-field light generating device for generating near-field light;

semiconductor substrate situated in a near-field area or in a vicinity thereof; and photodetector for detecting reflected light, from a recording layer, of the near-field light generated by said near-field light generating device, said photodetector being formed on the semiconductor substrate.

2. An optical head according to claim 1, wherein said near-field light generating device includes a fine opening formed in said semiconductor substrate.

3. An optical head according to claim 2, wherein said photodetector is formed around said fine opening.

4. An optical head according to claim 1, wherein said near-field light generating device includes a solid immersion lens holded by a holding portion of said semiconductor substrate.

5. An optical head according to claim 4, wherein said photodetector is formed in the holding portion.

6. An optical head according to claim 1, wherein said photodetector includes a photodiode formed in said semiconductor substrate.

* * * * *